F. D. DEMUTH.
COUNTERSHAFT CLUTCH.
APPLICATION FILED JAN. 2, 1917.
1,257,588.
Patented Feb. 26, 1918.
3 SHEETS—SHEET 2.
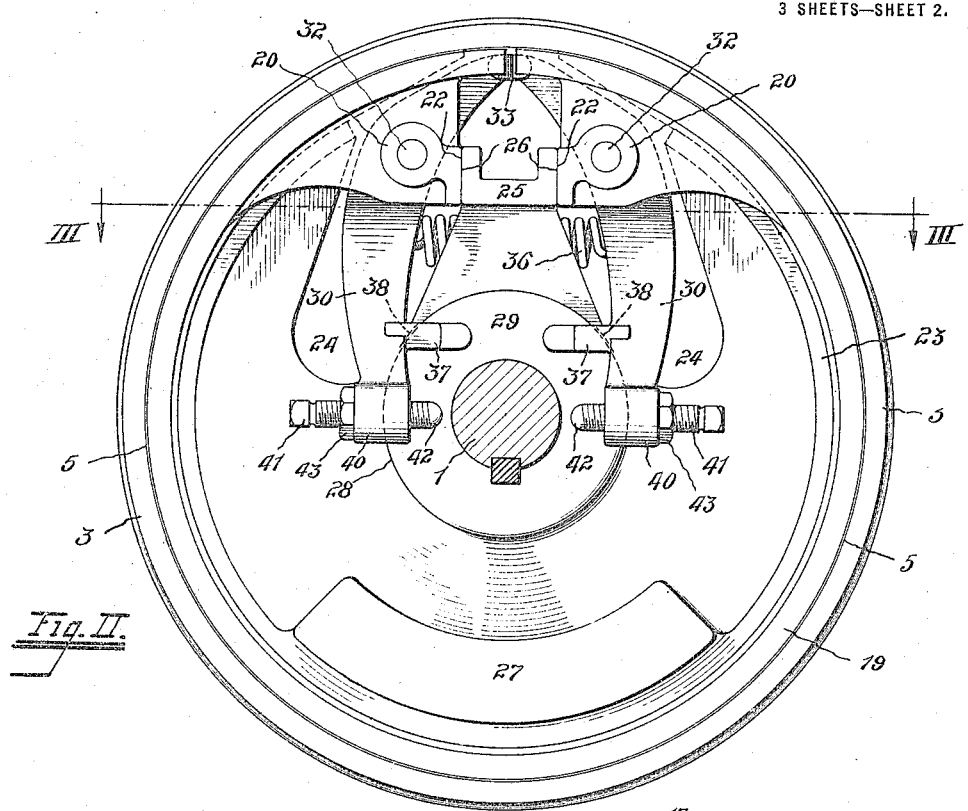
Fig. II.
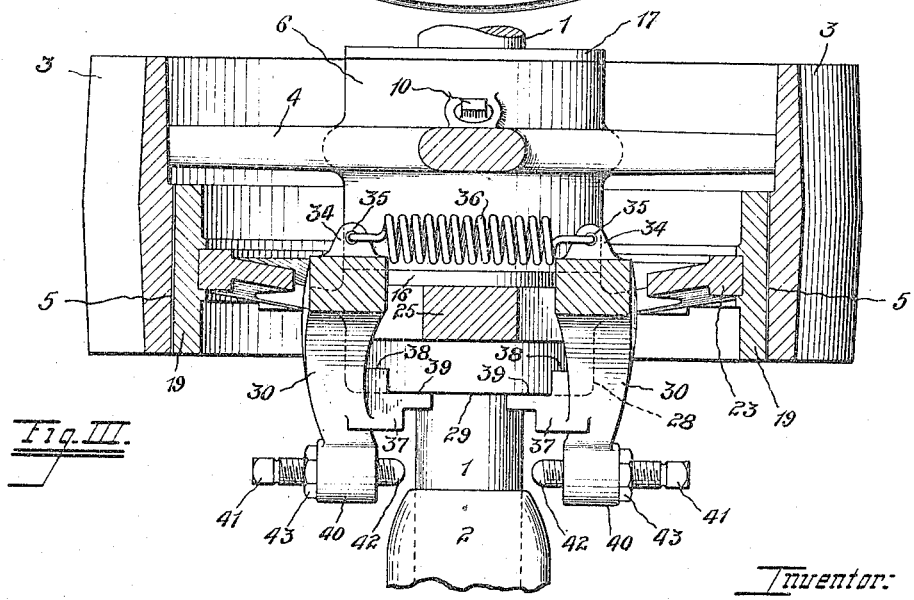
Fig. III.
Inventor:
Frederick D. Demuth
by his atty F. D. DEMUTH.
COUNTERSHAFT CLUTCH.
APPLICATION FILED JAN. 2, 1917.
1,257,588.
Patented Feb. 26, 1918.
3 SHEETS—SHEET 3.
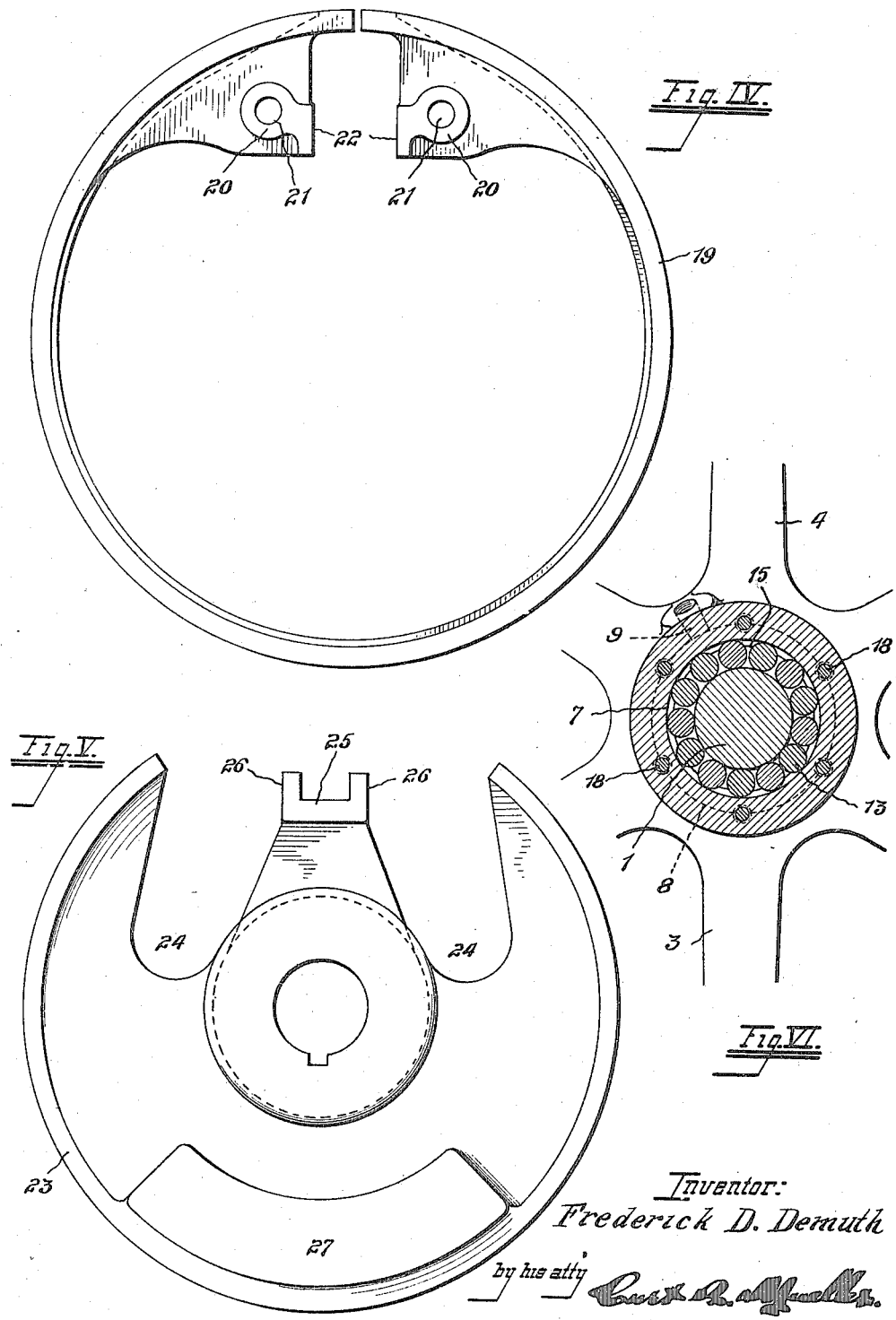
Inventor:
Frederick D. Demuth
by his atty

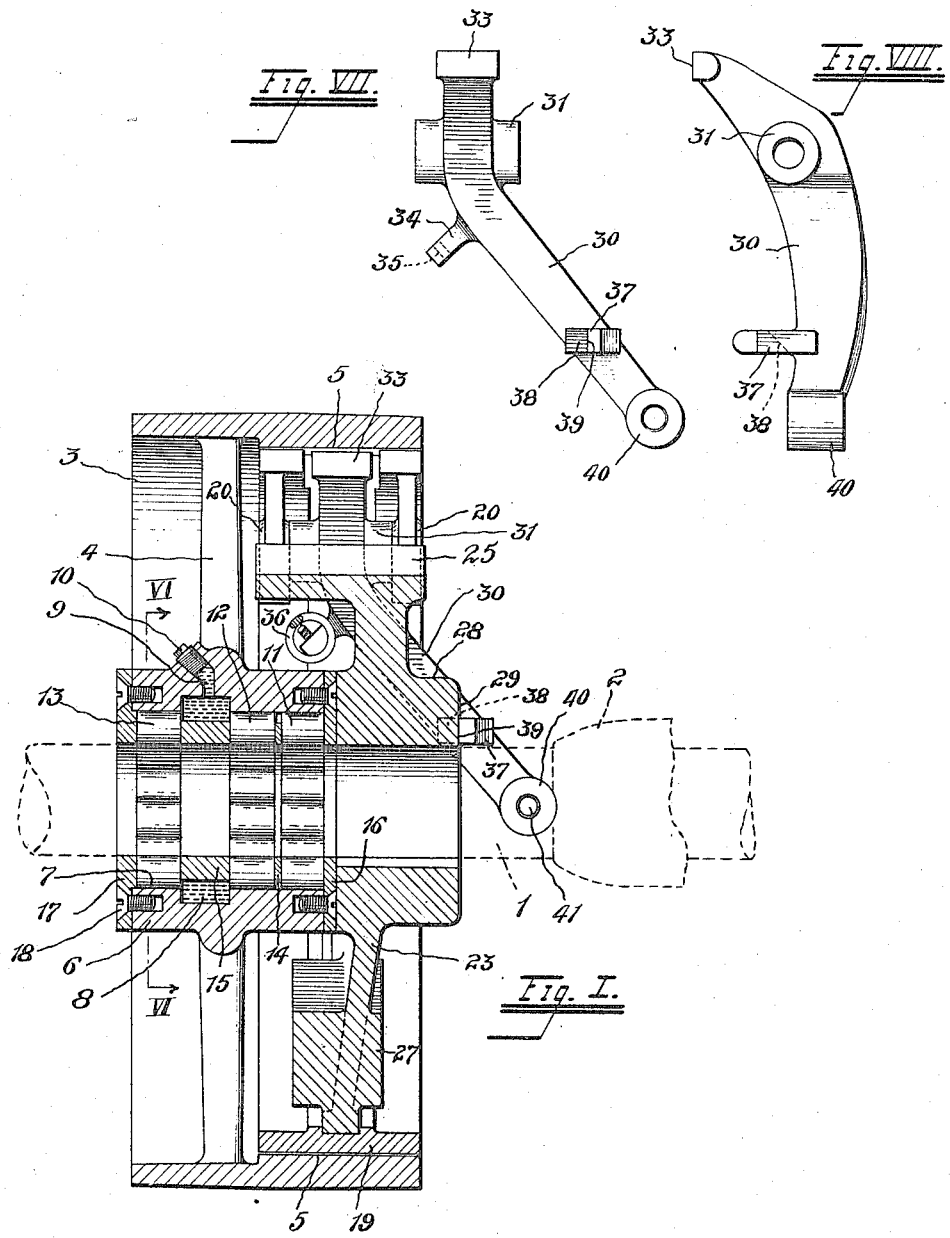

UNITED STATES PATENT OFFICE.

FREDERICK D. DEMUTH, OF CLEVELAND, OHIO.

COUNTERSHAFT-CLUTCH.

1,257,588.  Specification of Letters Patent.  Patented Feb. 26, 1918.

Application filed January 2, 1917. Serial No. 140,045.

*To all whom it may concern:*

Be it known that I, FREDERICK D. DEMUTH, a citizen of the United States, residing at city of Cleveland, in the county of Cuyahoga and State of Ohio, have invented a new and useful Improvement in Countershaft-Clutches, of which the following is a specification, the principle of the invention being herein explained and the best mode in which I have contemplated applying that principle, so as to distinguish it from other inventions.

My invention relates to a countershaft clutch including a friction pulley device, whereby a transmission of power may be effected.

I am well aware that this particular art is old and well developed, consequently, that my exemplifying invention represents only a series of specific improvements each of which however, enables me to realize a distinct advantage. The featured objects of my construction are:

To provide a clutch which is not only feasible and durable but always in perfect balance.

To provide a laterally compact arrangement requiring less pressure on the cone wedge to produce increased friction at the pulley.

To provide a driving spider loosely interposed between the ends of a floating friction ring in order to relieve the clutch fingers of the strain.

To provide a double acting stop for determining the normal position of the clutch actuating fingers.

To provide a grease well leading to the rollers.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Adverting to the drawings:

Figure I is a vertical section of a clutch embodying my invention, the shaft being shown in dotted lines.

Fig. II is an elevation of the same seen from the operating end.

Fig. III is a section on line III—III of Fig. II.

Fig. IV is a detail elevation of the clutch ring.

Fig. V is a similar view of another detail.

Fig. VI is a section on line VI—VI of Fig. I.

Figs. VII and VIII are elevations of different sides of the type of clutch finger employed.

Directing attention first to Fig. I, the shaft 1 carries a cone member 2 which is to be actuated in any suitable manner common to the art to the end of spreading apart a pair of clutch actuating fingers to be later described. A pulley 3 having spokes 4 is mounted for movement about the shaft 1 or together with it according to whether the clutch happens to be released or engaged. It may be inferred that the pulley is communicated with some other source of power such as a line shaft. The pulley has an interior annular friction surface 5, a hub 6 having a bore 7 somewhat larger than diameter of the shaft. The bore 7 is provided with an enlargement or annular groove 8. Communicating with such groove is a well 9 through which grease may be supplied and disclosed with any suitable type of screw cap 10. Disposed in the bore 7 are three circumferential sets of roller bearings 11, 12 and 13 respectively. It will be noticed that the rollers are rather short in length and interposed between the sets 11 and 12 is a separator 14, whereas between the sets 12 and 13 is a collar 15 of less thickness than the diameter of the rollers whereby an annular grease receptacle is formed in conjunction with the groove 8. Owing to this arrangement grease may be constantly supplied to the roller bearings as will be readily understood. By having the rollers not only comparatively short but separated the advantage is gained of minimizing the tendencies of end-wise twist. The roller bearings are held in place on the shaft 1 by retaining rings 16 and 17 which are in turn secured by screws 18.

Surrounding the hub 6 closely adjacent to the friction surface 5 of the pulley is a friction ring 19 split at one point as clearly appears in Fig. IV. The construction of this ring as employed by me is peculiar in having two pairs of ears 20, each pair being provided with an alined bearing 21 and moreover spaced from the other pair a greater distance than the peripheral gap of the ring. The opposed surfaces 22 of the ears are substantially flat and parallel for a reason to be presently explained.

Keyed to the shaft next beyond the friction ring 19 is a spider 23 and this element as designed and connected constitutes one of the features of my invention. Its formation is clearly shown in Fig. V to involve a pair of cut-out portions 24 so shaped as to cause a driving arm 25 to project midway therebetween. The extremity of the arm 25 is provided on two opposite sides with parallel flat surfaces 26 which are spaced apart the same distance as the surfaces 22 on the brake ring so that they may be brought in juxtaposition. In this manner any rotary movement imparted to the friction ring 19 is closely communicated to the spider 23 and consequently to the shaft 1. That side of the spider opposite the arm 25 with reference to its center is counter-weighted as designated by the reference numeral 27. Such a weight counter-balances the weight of the ears on the friction ring—indeed all of the mechanism co-acts to transfer power on the opposite side of the center. It should be noticed that the spider is shaped with a central forwardly projecting flange having right angularly related surfaces 28 and 29. These are best shown in Fig. I. Moreover, the inter-position of the spider serves to relieve the other less durable parts of the severe strain at the moment the transmission of power occurs. I consider one of the outstanding features of my invention to be the perfect balance which is enabled always to be obtained in consequence of the manner in which my structure tends constantly to stabilize by counterbalancing any friction that might momentarily be unevenly distributed around the pulley.

A pair of clutch actuating fingers 30 serve to directly operate the clutch in the usual manner. They are illustrated in detail in Figs. VII and VIII. As is there apparent they are curved in two directions and are provided near one end with hollow bosses 31 designed to be fitted between the pairs of ears 20 and there pivoted in place by means of pins 32 as is shown in Figs. I and II.

The extremities 33 of the fingers 30 which are nearest the bosses 31 are adapted to come in contact with each other at a point where the brake ring is split and substantially midway of the friction surface 5 as also may be seen in Figs. I and II. Each of the fingers 30 is provided beyond its pivotal pin 32 with reference to the outer extremities 33 with a projection 34 extending obliquely downward and provided with an opening 35. A tension spring 36 has its ends passed through the openings 35 and exerts a constant tendency to oscillate the fingers in the direction of separation of the extremities 33. Still further removed from its boss 31 each finger is provided with another projection 37. These extend toward each other and each is formed with an arcuate surface 38 adapted normally to bear against surface 28 on the spider and also with the flat surface 39 adapted to abut the surface 29 and thereby limit the action on the part of the fingers in one axial direction. It will be manifest that the surfaces 38 and 39 act as stops and the manner in which they conform to the surfaces 28 and 29 will be most clearly understood from an inspection of Fig. III.

The opposite extremities 40 of the fingers 30 are provided with alined screw threaded openings normally substantially perpendicular to and in the same plane as the axis of the shaft 1 as appears in Figs. I, II and III. Into such openings cap screws 41 having rounded inner ends 42 are inserted for adjustment toward or away from each other. They may be fixed by the lock-nuts 43. However they are symmetrical with reference to the contour of the cone 2 which is to be shoved therebetween. It is obviously desirable that the extremities 42 be centralized with reference to the cone 2 and the shaft with reference to the duty which they are to perform.

My invention differentiates from the majority of marketed clutches in a fundamentally important particular, namely, in having a friction ring and spider which are not connected with each other in the ordinary sense, but merely loosely interlocked and adapted solely to rotate together. The fingers only start to put the ring into contact with the pulley independently of the spider, which latter thereafter takes up the load. The spider does this by coming into engagement with one end of the ring. Afterward the binding effect is progressively increased according to the force applied between the spider and ring end. The action is so positive as to practically eliminate slipping, and may be said to be an automatic torsional maintenance of frictional engagement.

The operation of my clutch is as follows:

It may be assumed that the pulley 3 is rotating freely about the shaft 1. As the cone 2 is moved between the extremities of the fingers these are tilted or spread apart, but owing to the contact of their opposite extremities 33 the result is a spreading apart of the pins 32 and consequently of the ears 20 of the friction ring. Such action causes the expansion of the latter so as to effect its frictional engagement with the surface 5 on the pulley whereupon the latter transmits its rotation to the ring, thence to the spider and therefore to the shaft. While the assembling of the parts is notably compact, firm and durable support is provided for each and the whole is so evenly balanced that the parts ride easily with reference to each other and without the incurrence of any undue shock likely to distort and in consequence occasion rapid localized wear. More than that, the balance which is constantly maintained is so improved as to require a very slight pressure on the part of the cone in order to exert an enormous friction.

During the driving action the frictional engagement of the ring and pulley is automatically maintained by reason of the prevailing tendency of one free end of the ring to be separated from the other.

I claim:—

1. A device of the character described comprising, a pulley, an arcuate expansible structure for frictionally engaging said pulley, a shaft, and clutch actuating mechanism adapted operatively to connect said structure and pulley and including a part pivotally attached to said structure and a part keyed to said shaft, said parts being adapted for relative engagement so as to cause them to rotate together, said parts being capable of separation during the initiation of said rotary motion and being enabled constantly to exert a tendency to expand such structure during the rotation of the parts thereafter, and means adapted to control the position of said part which is pivotally attached to said structure.

2. A device of the character described comprising a pulley, a shaft, a spider secured to the latter, a floating friction ring adapted to engage said pulley, said ring being split, said spider being rotatably interlocked therewith, and means carried by said ring for effecting its engagement with the pulley whereby said spider is in turn engaged and rotated by said ring in such a way as to maintain the expansion of the latter.

3. A device of the character described comprising, a pulley, a shaft to be driven, and clutch mechanism adapted operatively to connect said members and including a split friction ring therebetween and a pair of fingers pivoted to the ends of said ring and a spider fitted between said ends.

4. A device of the character described comprising, a pulley, a shaft, a friction ring for engaging the former, mechanism carried by said ring for expanding the same, and a spider fixed to said shaft and having an extension loosely inserted between the ends of said ring and adapted to rotate in unison therewith and to have a driving engagement with one end thereof.

5. A device of the character described comprising, a pulley, a shaft, a split friction ring for engaging the former, means for expanding said ring, a spider fixed to said shaft and having a radially extending arm adapted to fit between the separated ends of and to rotate in unison with said ring, said spider being counterweighted diametrically opposite from its arm and means for guiding the movement of said fingers, the arrangement being such that the driving action automatically augments the frictional engagement of the ring with the pulley.

6. A device of the character described comprising, a pulley, a shaft, a split friction ring adapted to engage the former, a counterweighted spider loosely interposed between the ends of said ring and fixed to said shaft, and means for expanding said ring such that one of its ends depending upon the direction of rotation drives said spider.

7. A device of the character described, comprising a pulley, a shaft, a spider secured to said shaft, a split friction ring adapted for movement both in unison with and at intervals slightly relative to said spider, said ring being engageable with said pulley, and means movably connected to said ring for initiating the concerted action of the parts.

8. A device of the character described, comprising a pulley, a shaft, a spider fixed to said shaft and concentrically disposed within said pulley so as to be spaced therefrom, a split friction ring loosely positioned between said spider and pulley, said spider and ring being radially interlocked solely as to rotary action at the free ends of said ring whereby to rotate in unison, and means carried bodily by said ring for simultaneously moving the ends of said ring apart and relatively to said spider.

9. A device of the character described comprising, a pulley, a shaft, a friction ring adapted to engage the former, a spider keyed to said shaft and adapted to rotate with said ring, mechanism including yieldingly separable clutch fingers for expanding said ring, said fingers being provided each with a double acting stop whereby to limit movement thereof in two distinct directions.

10. A device of the character described comprising a pulley, a shaft, an expansible friction ring adapted to engage the former, a spider keyed to said shaft and adapted to rotate with said ring, mechanism for expanding said ring, a spring resisting the expanding action of said mechanism, said spider and mechanism having engageable surfaces, the arrangement being such that the action of said mechanism is limited in right angularly related directions by engagement at two points with said spider.

11. A device of the character described comprising, a pulley, a friction ring expansible thereagainst, a shaft, a spider carried by said shaft and rotatable with said ring, a pair of clutch fingers pivoted to said ring and having free ends diametrically opposed, a tension spring tending to draw such ends together, said fingers being provided with a projection adapted to engage said spider at two distinct points respectively and means for tilting said fingers against the action of said spring.

12. A device of the character described comprising, a shaft, a pulley surrounding the same, a split friction ring positioned interiorly of said pulley and provided with a pair of surfaces opposed to each other near its ends, a pair of clutch fingers pivoted adjacent said surfaces respectively, having one pair of ends adapted to abut at said pulley and another pair on substantially opposite sides of the axis of said shaft, a spring acting to draw said last mentioned pair of ends together whereby to contract said ring, a spider fixed to said shaft and fitted between said opposed ring surfaces, and axially movable means for spreading said fingers apart whereby to expand said ring about the common fulcrum at the other ends of the fingers, the arrangement being such that the rotation of said ring is communicated to said spider and by reason of the driving force therebetween a tendency automatically to expand such ring maintained.

13. A device of the character described, comprising a pulley, a shaft, a spider, having an arcuate edge concentric with said pulley fixed to said shaft and spaced from said pulley, a split friction ring freely supported between the arcuate edge and inner surface of said spider and pulley respectively, mechanism for expanding including reactingly connected arms pivoted to said ring, the latter being adapted to rotate in unison with said pulley and spider, and means for guiding the action of said expanding means against movement in relatively transverse directions.

14. A device of the character described, comprising a pulley, a split friction ring within said pulley and having ends spaced apart, a spider fixed to said shaft, said spider having an arcuate edge concentrically inclosed by said ring and also having a radial projection interposed between said ring ends such that said ring and spider may rotate in unison, and means for separating the ends of said ring from said projection and from each other preparatory to the initiation of the rotation thereof.

15. A device of the character described, comprising a pulley, a split friction ring adapted to engage the same interiorly, a shaft, a spider fixed to said shaft and interposed between juxta-positioned ends of said ring, and fingers pivoted to such ends and adapted to move the same away from said spider until said ring engages said pulley whereupon said spider is reëngaged and rotated by said ring.

16. A device of the character described, comprising a pulley, a shaft, a split friction ring adapted to engage the former, means carried by one of said parts for effecting such engagement, and a spider secured to said shaft and provided with an arm extending between the ends of said ring whereby operatively to connect said pulley and shaft in such a manner that the torsional action continually tends to expand said ring.

17. A device of the character described, comprising a pulley, a shaft, a split friction ring adapted to engage the former, means including clutch fingers for expanding said ring, said fingers being provided each with a stop whereby to limit movement thereof in a direction toward said shaft so as to centralize the whole, and a member operatively connecting said ring and shaft, said member being fixed to said shaft and having a part loosely interposed between the ends of said ring whereby the torsional action therebetween is automatically maintained.

18. A device of the character described, comprising a pulley, a shaft, a split friction ring adapted to engage the former, a spider fixed to said shaft and freely interposed between the divided ends of said ring whereby operatively to connect the same, and mechanism including clutch fingers tiltable against each other and adapted to expand said ring, said fingers being provided each with a projection whereby to limit movement thereof in a direction substantially parallel to said shaft, and means for tilting said fingers.

19. A device of the character described, comprising a pulley, a split friction ring within said pulley and fashioned with juxtaposed surfaces, a shaft, a spider secured upon said shaft and provided with an arm fitted between said surfaces to rotatably connect said ring and shaft, a pair of fingers pivoted intermediately of their ends to said ring, and means for separating one pair of ends of said fingers whereby to fulcrum their opposite ends against each other and initially move said surfaces away from said spider.

20. A device of the character described, comprising a pulley, a shaft, a split friction ring adapted to engage the former, means including a pair of fingers pivotally connected with the separated ends of said friction ring respectively and adapted to separate such ends, a spider secured to said shaft and provided with an arm extending between the ends of said ring and adapted rotatively to connect said pulley and shaft, and means for limiting the action of said fingers in two directions whereby to centralize and steady the whole.

21. A device of the character described, comprising a pulley, a shaft, a split friction ring adapted to engage the former, a spider keyed to said shaft and adapted for limited rotary movement relative to said ring, fingers articulating with and solely supported by said ring and adapted to fulcrum in direct engagement with each other on one side of the points of their articulation with said ring, a tension spring connecting said fingers on the other side of their points of articulation, and means for actuating said fingers.

Signed by me, this 24th day of July, 1917.

FREDERICK D. DEMUTH.

Copies of this patent may be obtained for five cents each, by addressing the "Commissioner of Patents, Washington, D. C."